United States Patent [19]

Tochacek et al.

[11] Patent Number: 5,692,777
[45] Date of Patent: Dec. 2, 1997

[54] LOW PERMEABILITY INFLATABLE RESTRAINT FABRIC

[75] Inventors: Miroslav Tochacek, Woodbury; Roger A. Brekken, Farmington Hills; Paul E. Hansen, Lake Elmo, all of Minn.

[73] Assignee: Minnesota Mining and Manufacturing Company, St. Paul, Minn.

[21] Appl. No.: 430,002

[22] Filed: Apr. 27, 1995

[51] Int. Cl.⁶ .................................................. B60R 21/20
[52] U.S. Cl. ...................... 280/743.1; 428/36.1; 428/102; 442/314
[58] Field of Search ........................... 428/102, 253, 428/284, 286, 287, 297, 298, 903, 36.1; 280/728.1, 743.1; 442/314

[56] References Cited

U.S. PATENT DOCUMENTS

| | | | |
|---|---|---|---|
| 4,443,516 | 4/1984 | Rogers | 428/253 |
| 4,615,934 | 10/1986 | Ellison | 428/253 |
| 4,619,120 | 10/1986 | Marhowitz | 428/253 |
| 4,891,957 | 1/1990 | Strack et al. | 66/192 |
| 5,192,600 | 3/1993 | Pontrelli et al. | 428/102 |
| 5,194,320 | 3/1993 | Groshens | 428/102 |
| 5,203,186 | 4/1993 | Zafiroglu | 428/102 |
| 5,302,432 | 4/1994 | Shigeta et al. | 428/102 |
| 5,308,674 | 5/1994 | Zafiroglu | 428/102 |

FOREIGN PATENT DOCUMENTS

| | | |
|---|---|---|
| 0 649 936 | 4/1995 | European Pat. Off. . |
| 3 644 554 | 4/1988 | Germany . |
| 5-51836 | 2/1993 | Japan . |
| 5-319195 | 3/1993 | Japan . |
| 2 055 407 | 3/1981 | United Kingdom . |

Primary Examiner—James J. Bell
Attorney, Agent, or Firm—Gary L. Griswold; Walter N. Kirn; Scott A. Bardell

[57] ABSTRACT

A stitch-bonded fabric suitable for use as an airbag.

1 Claim, 3 Drawing Sheets

LOW PERMEABILITY INFLATABLE RESTRAINT FABRIC

TECHNICAL FIELD

The present invention relates to low permeability fabrics suitable for use in passive restraint safety devices for motor vehicles.

BACKGROUND OF THE INVENTION

Passive restraint safety devices are a customer demanded component of the occupant safety package offered on motor vehicles. Airbags, a supplemental passive restraint device that is part of the passive restraint package, are designed to remain tightly folded in a small compartmenting in, for example, the motor vehicle's steering wheel assembly, dash board or door panel until such time as an accident triggers an instantaneous inflation of the bag with high pressure gas. Design requirements for the fabrics utilized in the airbags call for thin, flexible, strong, thermally and oxidatively stable fabrics having a low air permeability.

Airbags are typically made from high strength, woven fabrics which may have a coating to reduce the fabric permeability. Nylon fabrics, particularly rip stock nylon fabrics, are the most commonly used fabrics due to their high strength to weight ratio at a comparatively low cost.

Fabrics, coatings, and inflation technologies have also influenced the design and shape of airbags. Several bag designs have been introduced which utilize internal tethers to control the shape of the bag at maximum inflation, restraining the central portion of the bag to force a flattened pillow like shape rather than a spherical shape to provide improved vehicle occupant protection.

Inflation and subsequent deflation profiles of an airbag can be strongly impacted by the permeability of the airbag fabric. Low permeability favors rapid inflation to achieve the desired impact protection but may not allow rapid enough deflation to minimize rebound type injuries to a vehicle occupant without introducing vent holes on the rear panel of the airbag. Fabrics having higher permeability's may not allow an airbag to inflate rapidly enough to provide initial impact protection but they can allow the bag to deflate rapidly enough without supplemental vent holes to minimize rebound type injuries.

SUMMARY OF THE INVENTION

The present invention provides a stitch-bonded fabric suitable for use in an airbag, the fabric i) having first and second major surfaces, ii) comprising a thermoplastic base web and a two-bar warp knit structure, iii) having a Mullen burst strength of at least about 1.7 Mpa (preferably at least about 2.0 Mpa and more preferably at least about 2.5 Mpa) as measured by TEST METHOD A (described below), and iv) having a permeability of less than about 5 $cm^3/sec/cm^2$ (preferably less than about 2 $cm^3/sec/cm^2$ and more preferably less than about 1 $cm^3/sec/cm^2$) as measured by TEST METHOD B (described below).

The present invention also provides an airbag comprising a stitch-bonded fabric as described above. A preferred airbag consists essentially of such a stitch-bonded fabric (i.e., the airbag primarily derives its strength from the two-bar warp knit structure and its air permeability control from the thermoplastic base web, and optional polymeric coatings, films and vent holes).

The present invention still further provides a method of making a stitch-bonded fabric suitable for use in an airbag, the fabric i) having first and second major surfaces, ii) comprising a thermoplastic base web and a two-bar warp-knit structure, iii) having a Mullen burst strength of at least about 1.7 Mpa when measured by TEST METHOD A, and iv) having a permeability of less than about 5 $cm^3/sec/cm^2$ when measured by TEST METHOD B, comprising the steps of:

a) introducing the thermoplastic base web material into a stitch-bonding machine under tension;

b) forming a fabric by capturing said base web material within a two-bar warp-knit structure; and c) calendering the fabric under heat and pressure.

Figure 4:
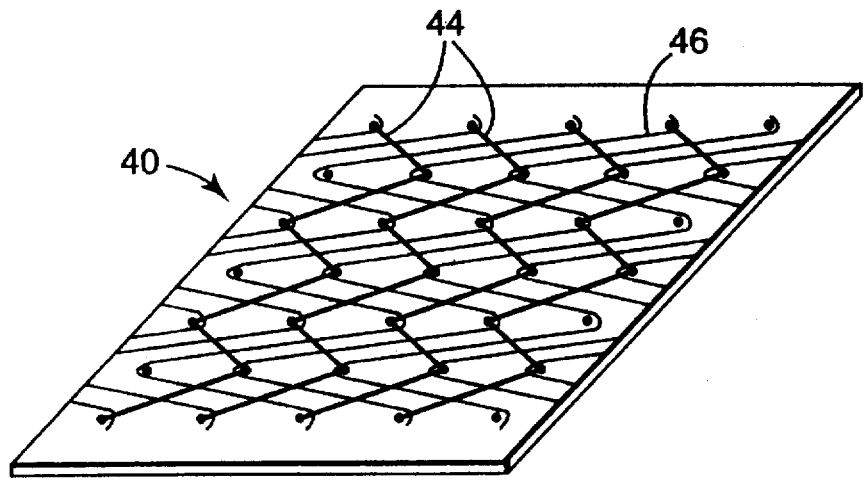
FIG. 4 is a schematic view of the technical back side of a second stitch-bonded fabric of the invention based on a tricot stitch with laid-in weft structure.
Figure 5:
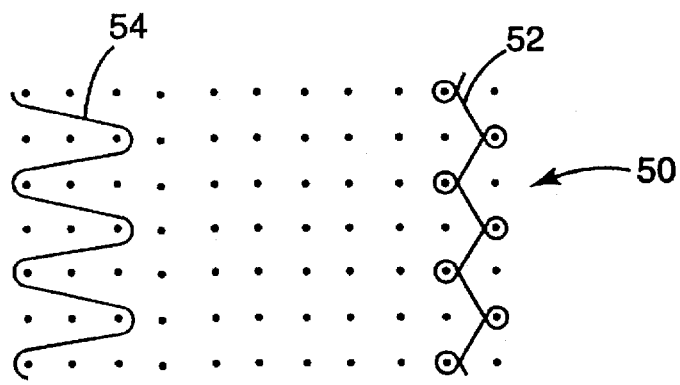
FIG. 5 illustrates the lapping diagram of the fabric of FIG. 4.

FIG, 6 is an illustration of the stitch pattern on the technical back side of the fabric of FIG. 4.

FIG, 7 is an illustration of a deployed drivers side airbag utilizing a fabric of the present invention.

Figure 8:
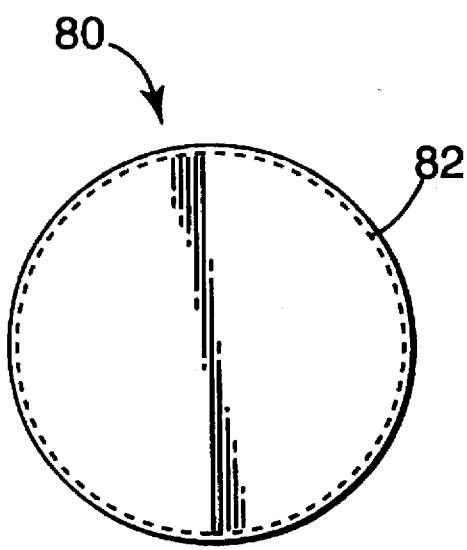

FIG. 8 is an illustration of the front panel of a drivers side airbag utilizing a fabric of the present invention.

Figure 9:
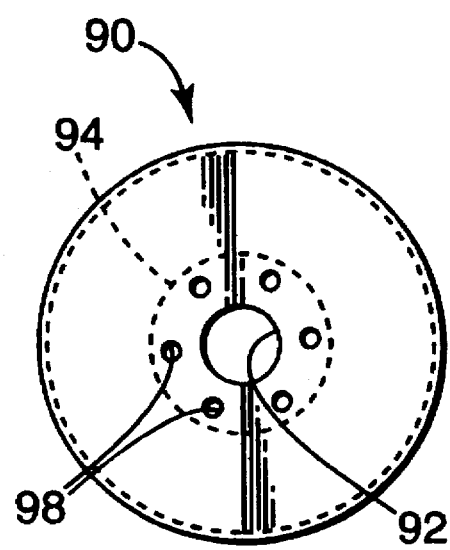

FIG. 9 is an illustration of the back panel of a drivers side airbag utilizing a fabric of the present invention.

DETAILED DESCRIPTION OF THE INVENTION

The present invention is a stitch-bonded fabric construction which is suitable for airbag components of inflatable passive restraint devices. The stitch-bonding operation forms a two-bar warp knit structure comprising rows of stitches in a spaced apart, interconnected arrangement, preferably at a spacing of 2 to 8 rows of stitches per centimeter width (20 to 80 gauge). The stitch density or frequency is adjustable over a wide range, but preferably is set to produce 2 to 10 stitches per centimeter length. Stitching threads are typically commercially available single filament fibers or multifilament yarns comprising by way of example polyamide (e.g., nylon), polyimide or polyester (e.g. PET). The stitch-bonding operation also allows a variety of materials to be captured by or contained within the two-bar warp knit structure.

More specifically, the two-bar warp knit construction employed in the practice of the present invention provides the primary strength to the construction. The stitching threads are stitched through a thermoplastic base web which controls the permeability of the fabric. The two-bar warp knit structure is exemplified in FIGS. 1–6. Thus, in FIG. 1 there is illustrated a schematic view of the technical back side 12 of a stitch-bonded fabric 10 of the invention which has anchoring pillars 14 of chain stitches with laid-in weft yarns 16. Stitching threads forming the pillars of chain stitches are stitched through the thermoplastic base web 18 and laid-in weft yarns 16 are passed behind the stitching needles in a predetermined pattern as the chain stitches are formed, but are retained on the technical back side of the stitch-bonded fabric (i.e. the laid-in weft threads are not stitched through the base web).

Figure 1:
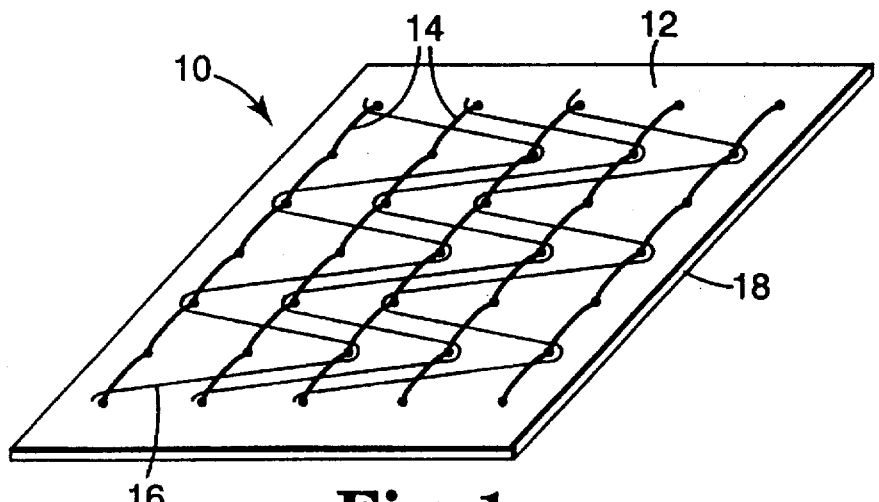
FIG. 1 is a schematic view of the technical back side of a stitch-bonded fabric of the invention based on a chain stitch with laid-in weft structure.
Figure 2:
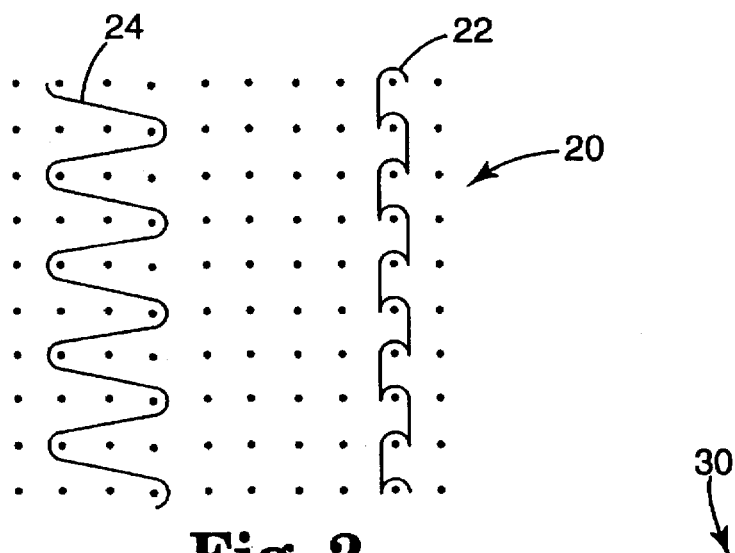
FIG. 2 illustrates the lapping diagram of the fabric of FIG. 1.

FIG. 2 exemplifies the lapping diagram 20 of the fabric 10 shown in FIG. 1. Anchoring pillars 22 were formed as a /1-0/0-1/ chain stitches and laid-in weft 24 were formed as a /0—0/3—3/ structure which was laid-in behind three needles during the for mation of anchoring pillar chain stitches 22.

Figure 3:
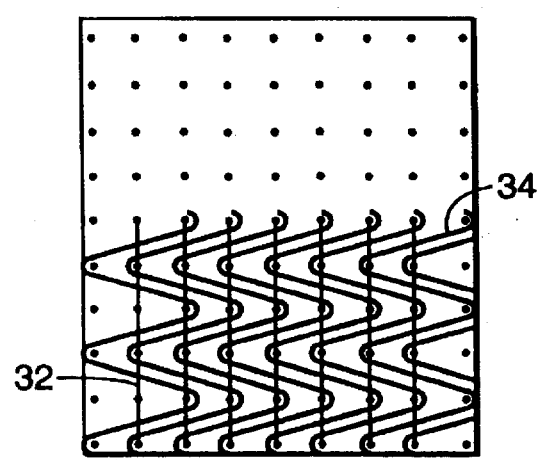
FIG. 3 is an illustration of the stitch pattern on the technical back side of the fabric of FIG. 1.

The combined anchoring pillar chain stitch and laid-in weft pattern formed on the technical back side of the fabric 10 is illustrated in FIG. 3. In this illustration the anchoring pillar chain stitches 32 appear as parallel dashed lines while the laid-in weft threads 34 appear as serpentine lines passing behind three chain stitches in a regular manner. Forming the laid-in weft structure in this manner reduces the likelihood of the stitch-bonded fabric tearing if a thread in an anchoring pillar 32 of chain stitches were to break. It is to be understood that while a single pattern for the laid-in weft is illustrated here, other patterns (e.g. a /0—0/3—3/6— 6/3—3/0—0/ pattern, which would pass the laid-in weft threads behind six anchoring pillar stitches) could further reduce the likelihood of a failure of the fabric if a thread in an anchoring pillar 32 of chain stitches were to break.

FIG. 4 is a schematic view of the technical back side of a second stitch-bonded fabric 40 of the present invention which has anchoring pillars 44 of tricot stitches with laid-in weft yarns 46. The structure of this stitch-bonded fabric is better understood with reference to FIG. 5, which illustrates the lapping diagram 50 of fabric 40. In fabric 40, anchoring pillars 52 are formed as /1-0/0-2/ tricot stitches and laid-in weft is formed as a /0—0/3—3/structure which is laid-in behind three needles during the formation of the anchoring pillar tricot stitches 52.

Figure 6:
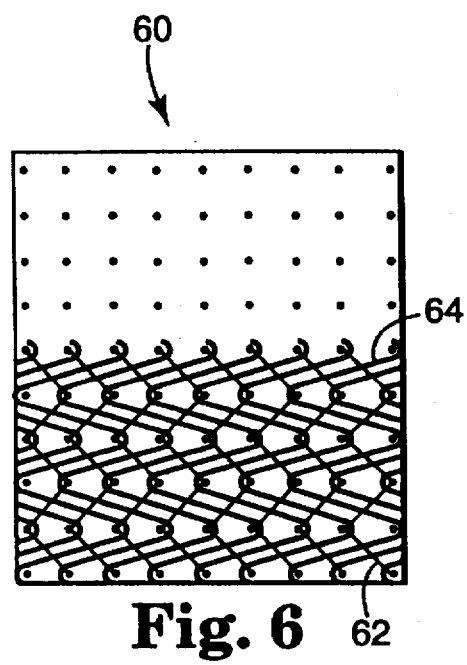

The combined anchoring pillar tricot stitch and laid-in weft pattern formed on the technical back side of the fabric 40 shown in FIG. 4 is exemplified in FIG. 6. In this illustration the anchoring pillar tricot stitches 62 appear as zigzag lines while the laid-in weft threads 64 appear as serpentine lines passing behind three tricot stitches in a regular manner. As was the case with fabric 10, alternative laid-in weft patterns could further reduce the likelihood of a fabric failure in the event of a thread in an anchoring pillar 62 breaking.

The strength of the stitch-bonded fabric can be controlled by the gauge of the fabric, the denier of the stitching thread, and the type of thread used to form the stitch-bonded structure. When maintaining a constant stitching thread, higher gauge fabrics (i.e. having more stitches per centimeter width) will be stronger than lower gauge fabrics. As indicated previously, fabrics of the present invention are prepared in a 20–80 gauge range, preferably in a 40–60 gauge range, and most preferably in a 50 gauge. Maintaining a constant gauge, larger denier filaments or yarns will produce stronger fabrics than a smaller denier filament or yarn. Stitching filaments or yarns ranging form 220 to 840 denier are suitable for use in preparing fabrics of the present invention. Generally speaking, preferred filaments or yarns which stitch through the base web to form anchoring pillars range from 220–500 denier and preferred filaments or yarns used for the laid-in weft range from 220–840 denier. A wide range of filaments or yarns can be utilized in stitch-bonding operations, but strength requirements for airbag fabrics dictate the use of polyamide (i.e. nylon) or polyester filaments or yarns in the preparation of the fabrics of the present invention. Preferably the filaments or yarn are oriented high tenacity fibers. Also preferably, the stitching threads are yarns (i.e. a bundle of smaller denier filaments which have been consolidated by a twist or similar consolidation) rather than single filaments as the yarns are more flexible than single filament threads.

Thermoplastic base webs used in the fabrics of the present invention encompass a variety of thermoplastic materials, including, but not limited to nonwoven webs, elastomeric films, and laminates of nonwoven webs and elastomeric films. Suitable nonwoven webs include spunbond materials, spun lace materials, melt blown microfiber webs, and air laid, consolidated webs. Preferably the nonwoven webs are based on small diameter or low denier fibers (i.e., less than about 10 denier, more preferably less than about 5 denier) which have low air permeability. Most preferred nonwoven base webs comprise elastomeric melt blown microfiber webs based, for example on urethane or polyester/urethane polymers, the webs having an average fiber diameter of less than about 50 microns.

Nonwoven base webs typically will have a basis weight ranging from about 50 g/m$^2$ to about 175 g/m$^2$, preferably from about 70 g/m$^2$ to about 150 g/m$^2$, and more preferably from about 70 g/m$^2$ to about 125 g/m$^2$. The move toward smaller passive restraint units has reduced the amount of space available for the storage of the airbags, which has in turn, driven bag fabrics toward thinner calipers. As a consequence of these considerations, the fabrics of the present invention preferably use the lowest basis weight base web possible that allows the desired permeability to be realized.

Fabric caliper as well as air permeability can be controlled by subjecting the stitch-bonded fabrics comprising a nonwoven web to calendering under heat and pressure. By appropriately selecting calendering conditions (i.e., heat, pressure and dwell time) the thickness of the nonwoven base web contained within the stitch-bonded fabric can be significantly reduced and the web transformed into a material having film-like qualities of varying degree, thereby reducing the air permeability of the stitch-bonded fabric. The skilled artisan will recognize that the appropriate calendering conditions are dependent on the thermoplastic material (s) which the base webs are prepared from. Generally speaking, processing conditions are selected so that the base webs are subjected to heat, pressure and dwell time to cause sufficient flow of the thermoplastic fibers to form a flexible film-like material that seals around the penetrating anchoring pillar stitches of the stitch-bonded fabric. Preferably the calendered stitch-bonded fabric have a caliper of from about 0.4 mm to about 1.0 mm.

Elastomeric films may also be used alone, or in combination with a nonwoven web, as the thermoplastic base web for the fabrics of the present invention. Elastomeric films typically provide lower air permeability for the stitch-bonded fabrics on the invention than nonwoven webs, but the stitch-bonding operation can adversely impact on the continuity of the film if the stitch-bonding operation is not carefully controlled. Laminates of elastomeric films and nonwoven webs are preferred when films are used as the laminate facilitates incorporation of the film into the stitch-bonded structure.

Figure 7:
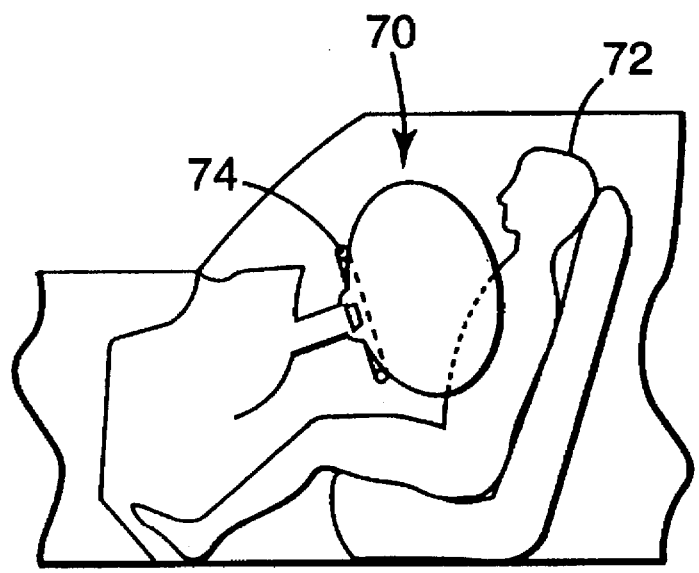

Now in respect to airbag constructions comprising a stitch-bonded fabric of the invention, a deployed drivers side airbag 70 is shown in FIG. 7. In this illustration, a sensor (not shown) has detected rapid deceleration of the vehicle indicative of a crash and the sensor has triggered the firing of an inflation device (not shown) which inflated airbag 70.

Forward movement of occupant 72 toward steering wheel 74 is thus restricted by inflated bag 70.

The front panel 80 of a typical driver's side airbag utilizing the fabrics of the present invention is exemplified in FIG. 8. Front panel 80 is mechanically joined to a back panel (not shown) by a row(s) of stitches 82 spaced inward of the perimeter of the panel.

Back panel 90 of the driver's side airbag is shown in FIG. 9. Rear panel 90 has a centrally located aperture 92 through which high pressure gas is introduced into the bag during inflation. Back panel 90 has an array of aperatures 98 spaced back from the perimeter of aperature 92 to receive the mounting bolts and metal flanges of the inflation device (not shown). Flange 92, which contains a multiplicity of apertures 98 corresponding to aperatures 98 on the back panel 90, is placed on the inside of the airbag prior to mounting the airbag to the inflator flange.

Occupant protection can be improved, particularly on the drivers side, when airbag inflation can be controlled to a flat, pillow like structure which can cushion a vehicle occupant impacting on the bag better than if the bag is spherical in shape. Airbags fabricated from standard woven fabrics typically inflate to a spherical shape because woven fabrics have quite uniform strength and elongation properties in both the machine and cross web directions when the same fiber is used for both the warp and weft. Stitch-bonded fabrics, however, display asymmetric strength and elongation properties in the machine and cross web directions. Stitch-bonded fabrics are typically stronger and show lower elongation in the machine direction than in the cross web direction because of the anchoring pillar stitch structure. Cross web, the laid-in weft threads have a less confining configuration which, although it contributes to the overall fabric strength, typically demonstrates a lower strength and a higher degree of elongation. The asymmetric strength and elongation properties can be advantageously utilized in constructing airbags, however, as by controlling the orientation of the stitch-bonded fabric, a reasonable degree of control over the shape of the inflated bag can be realized.

Test Procedures

Mullen Burst Strength

Burst strength of the fabrics of the invention was determined using ASTM test method D3786.

The aforesaid method is referred to in the instant specification and claims as TEST METHOD A.

Permeability

Fabric permeability (or resistance to air flow) can be calculated from normal pressure drop data for fabrics where the influence of Reynolds Number is small and the resistance of air flow through the fabric is linear with the air velocity, as discussed in ASTM F 788-82 which describes Standard Methods for Gas Flow Resistance Testing of Filtration Media. Thus, for the fabrics of the invention which have air permeability of greater than 1 $cm^3/sec/cm^2$, fabric permeability was determined by measuring the pressure drop across the fabric at 85 l/min. using a Model 8110 automated filter tester (manufactured by TSI Inc., St. Paul, Minn.) and the pressure drop data thus obtained was converted to permeability at 12.7 mm (0.5 in.) $H_2O$ using the relationship:

$$FP = v = K\Delta p$$

where FP is the Frazier Permeability (ASTM D-737) in $cm^3/sec/cm^2$, v is the face velocity in cm/sec, K is a constant, and $\Delta p$ is the pressure drop in mm of $H_2O$. (This relationship was verified for fabrics of the invention using independent ASTM D-737 permeability, pressure drop, and volumetric flow measurements.)

The permeability of fabrics having permeability of less than or equal to 1 $cm^3/sec/cm^2$ was determined using TAPPI test method T 460 om-88 (or Fed. Test Method Std. No. 191A Method 5452) which measures the time for 100 $cm^3$ of air to flow through 6.45 $cm^2$ of fabric at a pressure of 124.2 mm of $H_2O$. Flow time was converted to permeability at 12.7 mm (0.5 in.) $H_2O$ using the relationship:

$$v_{12.7} = [v_{124.2} (\Delta p_{12.7}/\Delta p_{124.2})]$$

where $v_{12.7} = P_{12.7}$, the permeability in $cm^3/sec/cm^2$ under 12.7 mm $H_2O$, $v_{124.2} = P_{124.2}$, the permeability in $cm^3/sec/cm^2$ at 124.2 mm $H_2O$, $\Delta p_{12.7}$ is the pressure drop at 12.7 mm of $H_2O$, and $\Delta p_{124.2}$ is the pressure drop at 124.2 mm of $H_2O$.

The aforesaid methods are referred to in the instant specification and claims as TEST METHOD B.

EXAMPLES

Example 1

A base web of an elastomeric melt blown microfiber web (BMF) based on Morton PS 440-200, an aromatic polyurethane available from Morton International, Inc. Seabrook, N.H., was prepared according to U.S. Pat. No. 5,230,701 (Meyer et. al.), which is incorporated herein by reference. This web, which had a basis weight of 125 $g/m^2$, was used as the base web in preparing a stitch-bonded web of the present invention.

A two-bar warp knit stitch-bonded fabric was prepared using an Arachne stitch-bonding machine (available from Kdynske Strojirny Co., Ltd, Kdyne, Czech Republic). The Arachne machine was configured for a 50 gauge (5 needles/cm) stitch pattern and a stitch density or frequency of 7.0 stitches/cm. The top bar of the machine was threaded with a high tenacity filament polyester yarn (1/440/100 RO2 T-68 Dacron, available from E. I. DuPont deNemours & Co., Wilmington, Del.) and the bottom bar was threaded with a second high tenacity polyester filament yarn, 1/440/96 BRT Type 781 (available from Hoechst Celanese Corp. Charlotte, N.C.). The polyurethane BMF base web was introduced into the Arachne machine under tension sufficient to prevent sagging or wrinkling prior to its being introduced into the stitching zone. Anchoring pillar stitches were formed as a /1-0/0-1/ chain stitch by the first bar and the second bar formed the weft laid-in as a /0—0/3—3/ structure, laid-in behind three needles. The Arachne unit was operated at a machine speed of 520 stitches per minute, producing approximately 0.7 linear meter of stitch-bonded fabric per minute. FIG. 1 is an illustration of the stitch-bonded fabric based a chain stitch with laid-in weft structure. FIG. 2 illustrates the lapping diagram of the fabric and FIG. 3 is an illustration of the technical back side of the fabric. The stitch-bonded fabric had a Mullen burst strength of 3.09 MPa and a permeability of 12.8 $cm^3/sec/cm^2$ as determined by ASTM D-737 of TEST METHOD B. Once calendered such as under the conditions hereinafter decreased, a fabric according to the invention could be obtained.

Example 2

A stitch-bonded fabric prepared as in Example 1 was calendered by passing the fabric between the rolls of a steel-steel single nip calender supplied by Webex, Inc., Neenah, Wis., which was operated at 163° C., a gap of 0.3 mm and a line speed of 0.61 m/min. The calendered stitch-bonded fabric had a Mullen burst strength of 2.63 MPa and a permeability of 0.25 cm³/sec/cm² by the TAPPI test method T 460 om-88 of TEST METHOD B.

Example 3

A stitch-bonded fabric was prepared according to the procedure of Example 1 except that the top bar was threaded with a high tenacity polyester filament yarn, 1/220/50 Type 68 (available from E. I. Du Pont) in place of the 1/440/100 polyester Type T-68 Dacron. The stitch-bonded fabric could be calendered to provide a fabric according to the invention.

Example 4

A stitch-bonded fabric was prepared according to the procedure of Example 2 except that a 0.008 mm thick film of XEL-31 film, available from Consolidated Technologies Film Co., Schaumberg, Ill., was laminated to the stitch-bonded fabric during the calendering step by calendering the fabric/film laminate at 185° C., a gap of 0.23 mm, and a line speed of 0.61 m/min. The laminated stitch-bonded fabric had a Mullen burst strength of 2.72 MPa and a permeability of 0.005 cm³/sec/cm², as measured by the TAPPI test method T 460 om-88 of TEST METHOD B.

Example 5

A 40% w/w solution of Kraton™ 6414, a styrene/butadiene block copolymer available from Shell Oil Co., Houston, Tex., in toluene was applied to 15.2×91.5 cm strip of the stitch-bonded fabric of Example 2 using a knife coating apparatus set at a 0.152 mm gap to produce an add-on of 95.2 g/m² after drying in a convection oven at 300° C. for 5 minutes. The coated stitch-bonded fabric had a Mullen burst strength of 3.19 MPa and a permeability of 0.12 cm³/sec/cm², as measured by the ASTM D-737 test method of TEST METHOD B.

Example 6

A stitch-bonded fabric was prepared according to the procedure of Example 1 except that a Sontara™ type 8801 poly(ethylene terephthalate)/wood pulp fiber web having a basis weight of 67 g/m², available from E. I. DuPont de Nemours and Co., Wilmington Del. was used as the base web in place of the polyurethane BMF web. A 0.25 mm thick PS 8010 polyurethane film, available from Shell Oil Company, Houston, Tex., was laminated to both faces of the stitch-bonded fabric by calendering a film/fabric/film laminate at 182° C., a gap of 0.0.18 mm, and a line speed of 0.61 m/min. to produce a fabric having a Mullen burst strength of 2.92 MPa and a permeability of 0.003 cm³/sec/cm², as measured by the TAPPI test method T 460 om-88 of TEST METHOD B.

Example 7

A stitch-bonded fabric was prepared according to the procedure of Example 6 except that a Typar™ Style 3301 gray spunbond polypropylene web having a basis weight of 98 g/m², available from Reemay Corp., Old Hickory, Tenn., was used as the base web in place of the Sontara web. The laminated fabric had a Mullen burst strength of 3.09 MPa and a permeability of 0.034 cm³/sec/cm², as measured by the TAPPI test method T 460 om-88 of TEST METHOD B.

Example 8

A laminated, stitch-bonded fabric was prepared according to the procedure of Example 6 except that a Typelle™ Type 5300 texturized spunbond poly(ethylene terephthalate) web, having a basis weight of 100 g/m², available from Reemay Corp., was used as the base web in place of the Sontara web. The laminated fabric had a Mullen burst strength of 3.00 MPa and a permeability of 0.004 cm³/sec/cm², as measured by the TAPPI test method T 460 om-88 of TEST METHOD B.

Example 9

A polyurethane BMF/polyurethane film laminate was formed by melt blowing the polyurethane web according to Example 1 and laminating a 0.25 mm thick PS 8010 polyurethane film to one face of the freshly blown BMF web. The lamination station, which was located approximately 30 cm downstream of the BMF collection area on the collector drum, consisted of a heated steel roll adjusted to just contact the collector drum in the absence of the polyurethane film in the nip. Lamination was accomplished by heating the lamination roll to 115° C. and bringing the film into intimate contact with the BMF web in the nip between the collector drum and the lamination roll. A stitch-bonded fabric was prepared according to the procedure of Example 1 except that the polyurethane BMF/film laminate was used as the base web in place of the polyurethane BMF web. The stitch-bonded fabric was calendered at 182° C., a gap of 0.0.18 mm, and a line speed of 0.61 m/min. to produce a fabric having a Mullen burst strength of 2.81 MPa and a permeability of 0.018 cm³/sec/cm², as measured by the TAPPI test method T 460 om-88 of TEST METHOD B.

Example 10

Stitch-bonded fabrics of Examples 2, 4, 5, 6 and 9 were converted into airbags by the following procedure:

Two identically sized circular panels were cut from the stitch-bonded fabrics and an inflation aperture cut in one of the panels. Airbag fabrication was completed by placing the front and back panels together with the technical face side of the two panels facing each other and the two panels joined together by a row(s) of stitches spaced inward of the perimeter of the panels. The bag was then inverted through the inflation aperture, positioning the perimeter seam on the interior surface of the bag. During the sewing operation, component pieces were positioned with their machine direction orientation aligned. A neoprene supporting flange, having a center opening approximately the same diameter of the inflation aperture cut in the back panel, was approximately 5 cm wide, and having holes corresponding to the size and position of bolts on the metal mounting flange of the inflation unit, was inserted into the bag and the bag mounted on the flange of the inflation device.

What is claimed is:

1. An inflatable, passive restraint device comprising an:
    (a) airbag made from a stitch-bonded fabric, said fabric i) having first and second major surfaces, ii) comprising an elastomeric thermoplastic base web and a two-bar warp knit structure, iii) having a Mullen burst strength of at least about 1.7 MPa as measured by TEST METHOD A, iv) having a permeability of less than about 5 cm³/sec/cm² as measured by TEST METHOD B, and v) said stitch-bonded fabric having a lower strength and a greater elongation in the weft direction than in the warp direction;
    (b) an inflator component; and
    (c) a sensing component.

* * * * *